(12) United States Patent
Yang et al.

(10) Patent No.: US 8,810,641 B2
(45) Date of Patent: Aug. 19, 2014

(54) TELEVISION, CONTROL METHOD AND CONTROL DEVICE FOR THE TELEVISION

(75) Inventors: Weilei Yang, Shandong (CN); Jinhong Sun, Shandong (CN); Liang Ma, Shandong (CN)

(73) Assignee: Hisense Hiview Tech Co., Ltd. (CN)

( * ) Notice: Subject to any disclaimer, the term of this patent is extended or adjusted under 35 U.S.C. 154(b) by 0 days.

(21) Appl. No.: 13/821,077

(22) PCT Filed: Jun. 15, 2011

(86) PCT No.: PCT/CN2011/075780
§ 371 (c)(1),
(2), (4) Date: Mar. 6, 2013

(87) PCT Pub. No.: WO2012/171190
PCT Pub. Date: Dec. 20, 2012

(65) Prior Publication Data
US 2013/0169786 A1    Jul. 4, 2013

(51) Int. Cl.
*H04N 5/232*    (2006.01)
*H04N 5/44*    (2011.01)
*G06F 3/01*    (2006.01)

(52) U.S. Cl.
CPC .............. *H04N 5/4403* (2013.01); *G06F 3/017* (2013.01)
USPC ........................................................ 348/77

(58) Field of Classification Search
None
See application file for complete search history.

(56) References Cited

U.S. PATENT DOCUMENTS

| | | | | |
|---|---|---|---|---|
| 5,594,469 | A * | 1/1997 | Freeman et al. | 345/158 |
| 2011/0248915 | A1 * | 10/2011 | Lu et al. | 345/156 |
| 2012/0275648 | A1 * | 11/2012 | Guan | 382/103 |
| 2012/0280900 | A1 * | 11/2012 | Wang et al. | 345/156 |

FOREIGN PATENT DOCUMENTS

| | | | |
|---|---|---|---|
| CN | 101437124 | A | 5/2009 |
| CN | 10180711 | A | 8/2010 |
| CN | 101930282 | A | 12/2010 |
| CN | 201854361 | U | 6/2011 |
| CN | 102221885 | B | 6/2013 |

* cited by examiner

*Primary Examiner* — Sath V Perungavoor
*Assistant Examiner* — Matthew J Anderson
(74) *Attorney, Agent, or Firm* — DLA Piper LLP (US)

(57) ABSTRACT

A television, a control method and a control device for the television are disclosed in the present invention. The control method for the television includes the following steps of: obtaining motion track points of a moving target and fitting the motion track points into a motion curve; calculating angle information corresponding to the motion track points on the motion curve; judging whether the angle information corresponding to a first track point in the motion track points and the angle information corresponding to a second track point in the motion track points are in the same preset range, wherein the first and second track points are adjacent; and when the angle information corresponding to the first track point and the angle information corresponding to the second track point are not in the same preset range, generating a control instruction to control the action of the television. By the present invention, a user can conveniently control the television by utilizing gestures.

7 Claims, 6 Drawing Sheets

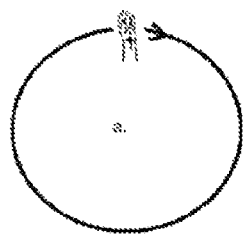 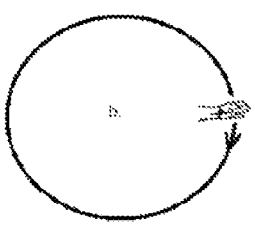 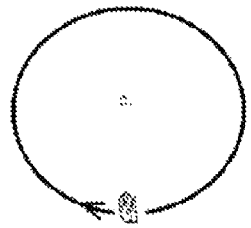 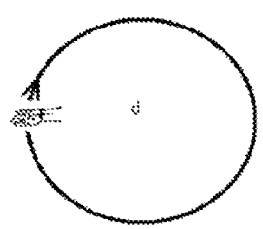
Fig.7a     Fig.7b     Fig.7c     Fig.7d
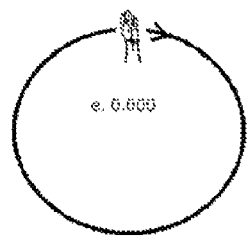 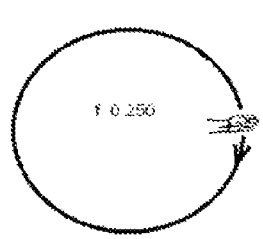 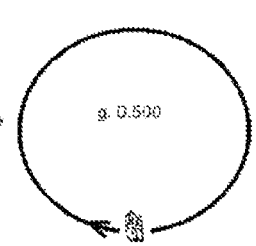 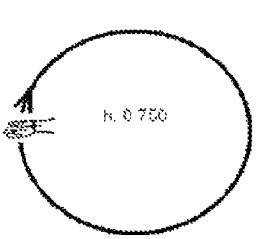
Fig.7e     Fig.7f     Fig.7g     Fig.7h
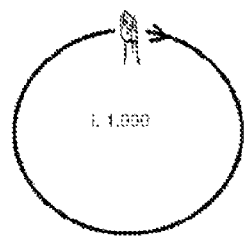 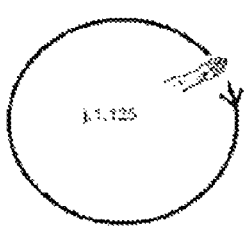 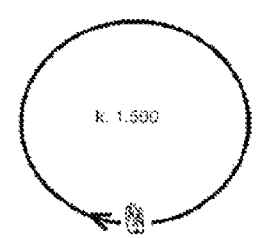 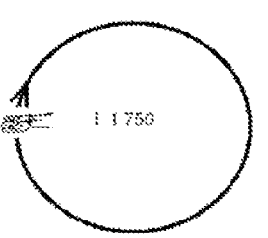
Fig.7i     Fig.7j     Fig.7k     Fig.7l
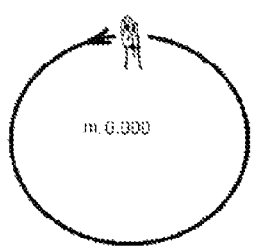 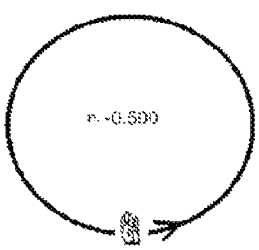 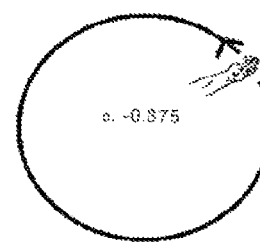 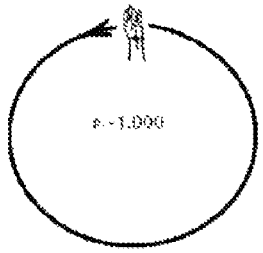
Fig.7m     Fig.7n     Fig.7o     Fig.7p

TELEVISION, CONTROL METHOD AND CONTROL DEVICE FOR THE TELEVISION

CROSS REFERENCE TO RELATED APPLICATION

The present application is a §371 of International Application No. PCT/CN2011/075780, filed 15 Jun. 2011, the subject matter of which is incorporated by reference.

FIELD OF THE INVENTION

The present invention relates to the field of television sets and particularly to a television set and a control method and apparatus thereof.

BACKGROUND OF THE INVENTION

In the context of tri-network integration, a television set is provided with increasingly powerful functions, and consequentially a remote control device has increasingly complicated operations as well, thus bringing numerous operational inconveniences to a user of the television set.

In the prior art, an increasing number of television sets are controlled by a gesture, and this new control mode of television set greatly improves the usability and convenience of the television sets. Gestures including "Up/Down", "Left/Right", etc., are typically adopted in the existing gesture control mode so that volume adjusting or channel switching is controlled with a gesture corresponding to a command. By way of an example of controlling of volume adjusting by an "Up/Down" gesture, a user often has to make a number of a gesture to reach a control effect dependent upon the number of motions of his hand being corresponding to a control command. For example, one "Up" or "Down" gesture corresponds to a "Volume+1" or "Volume−1" command, then the user has to make 50 "Up" gestures repeatedly to adjust from "Volume 10" to "Volume 60". Thus a number of actions are necessary for the user to control a television set in the foregoing control mode, thus resulting in a poor experience and operational inconveniency; and also an incorrect command may be generated if a recognition period of time is still active when the user resets his hand after performing volume adjusting or channel switching, and in order to obviate this trouble, he has to keep the hand immobile until the active recognition period of time elapses, also resulting in operational inconveniency of the user.

There is not an effective solution to address the problem of operational inconveniency of a user controlling a television set by a gesture in the prior art.

SUMMARY OF THE INVENTION

The invention has been made in view of the problem of operational inconveniency of a user in a method of controlling a television set by a gesture, and to this end, a general object of the invention is to provide a television set and a control method and apparatus thereof so as to address the foregoing problem.

In order to attain the foregoing object, there is provided according to an aspect of the invention a control method of a television set.

A control method of a television set according to the invention includes:

obtaining motion locus points of a moving object and fitting the motion locus points to a motion curve;

calculating angular information corresponding to the motion locus points on the motion curve;

determining whether the angular information corresponding to a first locus point among the motion locus points is in the same preset range as the angular information corresponding to a second locus point among the motion locus points, wherein the first locus point is adjacent to the second locus point; and generating a control instruction to control the television set to act when the angular information corresponding to the first locus point is not in the same preset range as the angular information corresponding to the second locus point.

In order to attain the foregoing object, there is provided according to another aspect of the invention a control apparatus of a television set.

A control apparatus of a television set according to the invention includes:

an obtaining module configured to obtain motion locus points of a moving object and to fit the motion locus points to a motion curve; a calculating module configured to calculate angular information corresponding to the motion locus points on the motion curve; a determining module configured to determine whether the angular information corresponding to a first locus point among the motion locus points is in the same preset range as the angular information corresponding to a second locus point among the motion locus points, wherein the first locus point is adjacent to the second locus point; and a controlling module configured to generate a control instruction to control the television set to act when the angular information corresponding to the first locus point is not in the same preset range as the angular information corresponding to the second locus point.

In order to attain the foregoing object, there is provided according to another aspect of the invention a television set, and the television set according to the invention includes: a camera configured to capture images; and a control apparatus of the television set configured to fit motion locus points of a moving object in the images to a motion curve; to calculate angular information corresponding to the motion locus points on the motion curve; to determine whether the angular information corresponding to a first locus point among the motion locus points is in the same preset range as the angular information corresponding to a second locus point among the motion locus points, wherein the first locus point is adjacent to the second locus point; and to generate a control instruction to control the television set to act when the angular information corresponding to the first locus point is not in the same preset range as the angular information corresponding to the second locus point.

With the invention, a control command is generated in response to a change in angular information of an adjacent motion locus point of a hand of a user, and further a television set is controlled to act, thereby addressing the problem of an inconvenient operation of the user when the user controls the television set by a gesture and further achieving the effect of facilitating control of the television set by the user using the gesture.

BRIEF DESCRIPTION OF THE DRAWINGS

The drawings constituting a part of this application serve to provide further understanding of the invention, and illustrative embodiments of the invention and a description thereof serve to set forth but not limit unduly the invention. In the drawings:

FIG. 7a to FIG. 7p are schematic diagrams of a gesture for controlling a television set according to an embodiment of the invention.

DETAILED DESCRIPTION OF THE EMBODIMENTS

It shall be noted that embodiments in this application and features in the embodiments can be combined with each other without any conflict. The invention will be detailed below with reference to the drawings and in connection with the embodiments.

First Embodiment

Figure 1:
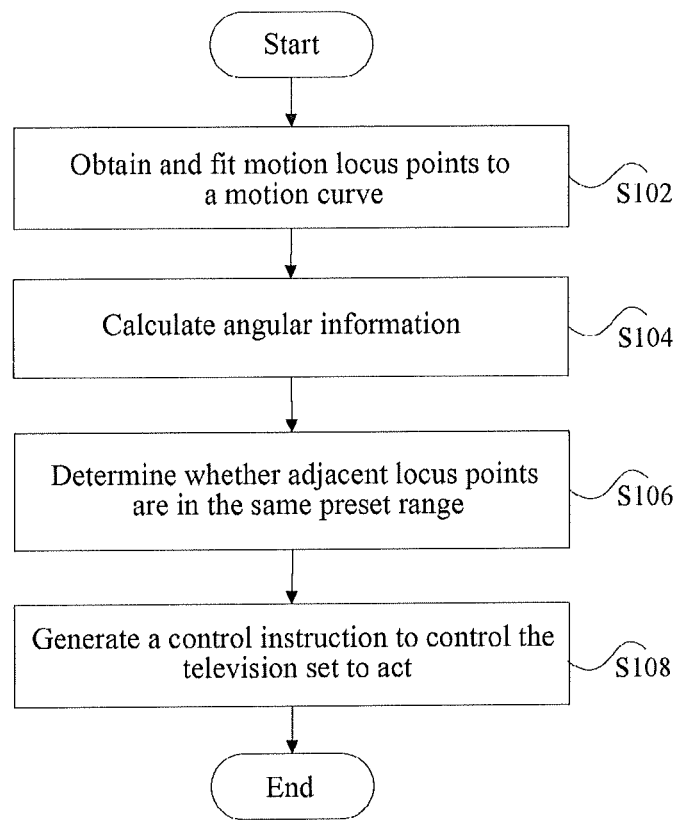
FIG. 1 is a flow chart of a control method of a television set according to an embodiment of the invention.

FIG. 1 is a flow chart of a control method of a television set according to an embodiment of the invention.

It shall be noted that a control method of a television set according to an embodiment of the invention can be used in a television set according to an embodiment of the invention and a television set according to an embodiment of the invention can also perform a control method of a television set according to an embodiment of the invention.

As illustrated in FIG. 1, the method includes the following steps 102 to 108:

The step S102 is to obtain motion locus points and fit motion locus points to a motion curve.

Motion locus points of a moving object are obtained and fitted to a motion curve. A camera is controlled to capture images continuously (e.g., 30 fps, that is, 30 frames of images captured per second, or 15 fps, that is, 15 frames of images captured per second, dependent upon a parameter of the camera, where an advantage of the present technical solution also lies in being free of being influenced and limited by the parameter), and motion locus points are extracted from several consecutive frames of images in a moving object detection algorithm, an image segmentation method or the like. The consecutive motion locus points are fitted to a motion curve in a planar rectangular coordinate system in the images corresponding thereto, and this fitting process is performed in any curve fitting method including a least-square fitting algorithm, etc.

The step S104 is to calculate angular information.

Angular information corresponding to the motion locus points on the motion curve is calculated.

The step S106 is to determine whether adjacent locus points are in the same preset range.

It is determined whether the angular information corresponding to a first locus point among the motion locus points is in the same preset range as the angular information corresponding to a second locus point among the motion locus points, where the first locus point is adjacent to the second locus point.

The step S108 is to generate a control instruction to control the television set to act.

In the foregoing control method of a television set, the angular information of the motion locus points of the moving object is taken as a parameter to control the television set, and the motion locus curve of a gesture of a user is only defined in shape but not in radius of the curve and motion speed, so the television set can be better controlled by a gesture of the user using the control apparatus and also control of the television set by the user with a gesture can be further facilitated.

A control instruction to control the television set to act is generated when the angular information corresponding to the first locus point is not in the same preset range as the angular information corresponding to the second locus point.

Preferably, the angular information corresponding to the motion locus points on the motion curve is calculated as follows:

When the motion curve is a closed curve, positional information of the motion locus points on the closed curve is determined.

It is determined as follows whether the angular information corresponding to the first locus point among the motion locus points is in the same preset range as the angular information corresponding to the second locus point among the motion locus points:

It is determined whether a polar angle corresponding to the polar angle information is above a preset polar angle.

A control instruction to control the television set to act is generated as follows when the angular information corresponding to the first locus point is not in the same preset range as the angular information corresponding to the second locus point:

The control instruction is generated when the polar angle corresponding to the polar angle information is above the preset polar angle.

It shall be noted that the closed curve as mentioned in the embodiment of the invention can be a circle, an ellipse or an arc-like curve approximate to a circle or an ellipse as long as the fitted-to curve can accommodate calculation of an angle.

Preferably the angular information corresponding to the motion locus points on the motion curve is calculated as follows:

A product of first sine and cosine and a product of second sine and cosine are calculated, where the product of the first sine and cosine is the product of the sine and the cosine of the angular information corresponding to the first locus point, and the product of the second sine and cosine is the product of the sine and the cosine of the angular information corresponding to the second locus point.

It is determined as follows whether the angular information corresponding to the first locus point is in the same preset range as the angular information corresponding to the second locus point points:

It is determined whether the product of the first sine and cosine has the same sign as the product of the second sine and cosine.

A control instruction to control the television set to act is generated as follows when the angular information corresponding to the first locus point is not in the same preset range as the angular information corresponding to the second locus point:

A control instruction to control the television set to act is generated when the product of the first sine and cosine has a different sign from the product of the second sine and cosine.

Preferably both the product of the first sine and cosine and the product of the second sine and cosine are calculated in the formula of:

$$N=[\sin(Q*\theta)]*[\cos(Q*\theta)],$$

Where θ represents a polar angle, N represents the product of the sine and the cosine of the polar angle, and Q represents any real number.

Preferably the value of Q is 2.

Preferably the angular information corresponding to the motion locus points on the motion curve is calculated in the formula of:

$$\theta=\mathrm{mod}(\pm X.XXX,1.0)*2\pi,$$

Where θ represents a polar angle, ±X.XXX represents positional information of the motion locus points, "+" represents the motion direction of the moving object being the clockwise direction, "−" represents the motion direction of the moving object being the anticlockwise direction, an integer part preceding "." represents the number of circles that the moving object has completed on the motion curve, and a fraction part following "." represents the position of the moving object on the motion curve.

Preferably the moving object is a hand of the user.

Optionally this embodiment is performed in the following steps:

The step 1 is to initialize parameters. The parameters M and N are set and initialized as M=0 and N=0, where M records the sign of the product of the sine and the cosine of the polar angle of a previous locus point, and N records the sign of the product of the sine and the cosine of the polar angle of a current locus point.

The step 2 is to divide into quadrants. Q is determined as 1, and a planar rectangular coordinate system is divided into 4 quadrants, where 0 to 90 degrees are the first quadrant, 90 degrees to 180 degrees are the second quadrant, 180 degrees to 270 degrees are the third quadrant, and 270 degrees to 360 degrees are the fourth quadrant.

The step 3 is to calculate the product of the sine and the cosine of a polar angle. Let N=sin θ*cos θ, where θ represents the polar angle of the current locus point.

The step 4 is to determine the sign of the product of the sine and cosine products. The value of M*N is calculated, and it is determined whether M*N is above 0. If it is the first locus point, then no action is taken for M*N=0; if M*N>0, then it indicates that the two adjacent locus points taken consecutively are in the same quadrant and no command is transmitted; and if M*N<0, then it indicates that the two adjacent locus points taken consecutively are not in the same quadrant and a command is transmitted.

The step 5 is to calculate the next locus point. Let M=N regardless of whether a command is transmitted, and the +X.XXX parameter of the next locus point is retaken and the polar angle of the next locus point is calculated. The step 3, the step 4 and the step 5 are repeated until no new locus point is taken where the step 6 is performed.

The step 6 is to end the process. The process returns with the values of M and N being reset to 0.

In this embodiment, it is proposed from an insight and an analysis of the motion regularity of a human body to control the number of times that a command is transmitted in this way the sign of the product of sine and cosine varies across adjacent quadrants. Since each user draws a circle at a varying speed and amplitude and a different camera captures a varying number of frames of images per second ranging from 15 fps to 30 fps, the number of times that a command is transmitted can not be controlled accurately with any of parameters related to the foregoing objective factors. We use the parameter of polar angle for the same or similar control experience of different users under different conditions. The users intend to draw a circle to transmit a fixed number of commands regardless of whether they draw it quickly or slowly and whether the radius thereof is large or small, and a polar angle is a relatively stable parameter influenced only by the extent that the circle is completed under the foregoing condition. A study shows that a user can complete two circles at most per second in a natural control status, so a camera can capture locus points distributed uniformly across adjacent quadrants regardless of whatever specific parameters as long as the number of frames of the camera is above 15 fps. We assume the worst case, for example, in which the number of frames of a camera is 15 fps and a user draws two circles per second. The user draws a circle starting in the first quadrant, and in the foregoing method of transmitting a command, he comes back to the first quadrant after it takes him 0.5 second to complete one circle, and the camera captures 7 to 8 frames of images, that is, we can obtain 7 to 8 locus points after an analysis in software, and these several locus points are distributed uniformly in the four quadrants in each of which there is at least one locus point. Thus the products of sine and cosine for two locus points adjacent in time and distributed in different quadrants are sure to have a different sign from each other, and a command can be transmitted for the locus point later with MN<0. Since there is a locus point in each of the four quadrants, four commands are ensured to be transmitted while the user draws one circle assuming the foregoing worst condition. The larger the number of frames that the camera captures per second is, and the slower the operation of the user is, the larger the number of obtained locus points is, the larger the number of locus points distributed in each quadrant is, and the easier it is to distinguish between the quadrants, thus further ensuring transmission of four commands per circle.

A command includes any one or more of: adjusting the volume of the television set; changing a channel of the television set; zooming in or out a picture browsed with the television set; zooming in or out a web page browsed with the television set; fast forward or fast backward of music played with the television set; fast forward or fast backward of a video played with the television set; and zooming in or out a picture of a game played with the television set.

The control mode with clockwise and anticlockwise drawing of a circle is very simple but still can perform numerous operations for existing intelligent television sets. The following description will be given with respect to common functions of a television set:

1. Watching a television program. This is the most common function of a television set, and we can make the two clockwise and anticlockwise gestures correspond respectively to the two operations of boosting and lowering volume and of switching to previous and next channels.

2. Multimedia applications. An increasing number of television set users come to frequently use multimedia applications of a television set, and five common media applications will be described here.

(1) The two clockwise and anticlockwise gestures correspond respectively to the two operations of zooming in and out a picture being browsed.

(2) The two clockwise and anticlockwise gestures correspond respectively to the two operations of zooming in and out a web page being browsed, and the volume of the web page can also be controlled on the precondition of distinguishing a gesture to invoke the function of controlling the volume of the web page from the gestures to invoke the functions of zooming in and out the web page.

(3) The two clockwise and anticlockwise gestures correspond respectively to the two operations of fast forward and fast backward of music being played, and the volume at which the music is played can also be controlled on the precondition of distinguishing a gesture to invoke the function of controlling the volume of the music from the gestures to invoke the functions of fast forward and backward of the music.

(4) The two clockwise and anticlockwise gestures correspond respectively to the two operations of fast forward and fast backward of a movie being played, and the volume at which the movie is played can also be controlled on the precondition of distinguishing a gesture to invoke the function of controlling the volume of the movie from the gestures to invoke the functions of fast forward and fast backward of the movie.

(5) The two clockwise and anticlockwise gestures correspond respectively to the two operations of boosting and lowering the sound effect a game being played.

In the embodiment of the invention, the television set is controlled with the action of drawing a circle and a transmitted command is set flexibly with information of a polar angle information of the drawn circle without being influenced by the radius of the circle, the frame parameter (fps) of the camera and the motion speed and amplitude of the action of the user, thereby avoiding repeated operations of the user for the same control command to adjust volume and to switch forward or backward a channel and also improving the preciseness of control.

Since a circular locus is significantly distinguished from a conventional action locus, the user can reset the location of his hand at any time in the course of controlling the volume of the television set without concerning a secondary change to volume and a channel due to the varying location of the hand while eliminating a stability factor due to manipulation by the "Up/Down" gestures. During processing of data, various items of data are obtained from a separate analysis of the respective data, the amount of transmitted data for processing is greatly reduced, and less complicated calculation is involved, so the real-time property is further enhanced to thereby facilitate an operation of the user and to be more appropriate for a practical application.

Second Embodiment

Figure 2:
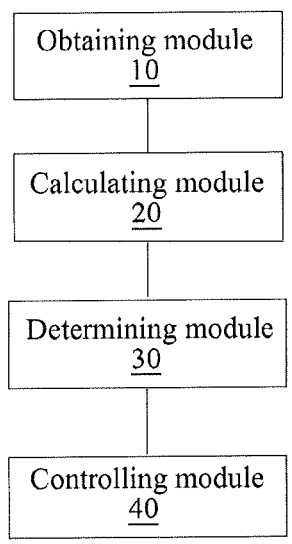
FIG. 2 is a schematic diagram of a control apparatus of a television set according to a first embodiment of the invention.

FIG. 2 is a schematic diagram of a control apparatus of a television set according to a first embodiment of the invention, and as illustrated in FIG. 2, the control apparatus of the television set includes:

An obtaining module 10 configured to obtain motion locus points of a moving object and to fit the motion locus points to a motion curve;

A calculating module 20 configured to calculate angular information corresponding to the motion locus points on the motion curve;

A determining module 30 configured to determine whether the angular information corresponding to a first locus point among the motion locus points is in the same preset range as the angular information corresponding to a second locus point among the motion locus points, where the first locus point is adjacent to the second locus point; and A controlling module 40 configured to generate a control instruction to control the television set to act when the angular information corresponding to the first locus point is not in the same preset range as the angular information corresponding to the second locus point.

In this embodiment, the control apparatus of the television set obtains images of the moving object from a camera through the obtaining module, where the camera captures a plurality of images consecutively in a period of time to constitute a motion locus of the moving object, and then the control apparatus of the television set fits the motion locus to the motion curve in a corresponding fitting algorithm and algorithm implementing platform, calculates the angular information corresponding to the respective motion locus points on the motion curve through the calculating module, determines whether the angular information of two adjacent locus points is in the same preset range through the determining module and generates a control instruction to control the television set to act through the controlling module when the angular information of the two locus points is not in the same preset range, and since whether to transmit a control instruction is determined from the angular information, the purpose of facilitating an operation of a user can be achieved. Particularly the angular information can be polar angle information of a motion locus point, and the x axis of the polar coordinates where a polar angle corresponding to the polar angle information is located takes the center of the fitted-to curve as the origin and points to the initial point of the fitted-to curve. In the control apparatus of the television set according to this embodiment, the angular information of the motion locus points of the moving object is taken as a parameter to control the television set, and the motion locus curve of a gesture of the user is only defined in shape but not in radius of the curve and motion speed, so the television set can be better controlled by a gesture of the user using the control apparatus and also control of the television set by the user with a gesture can be further facilitated.

Third Embodiment

Figure 3:
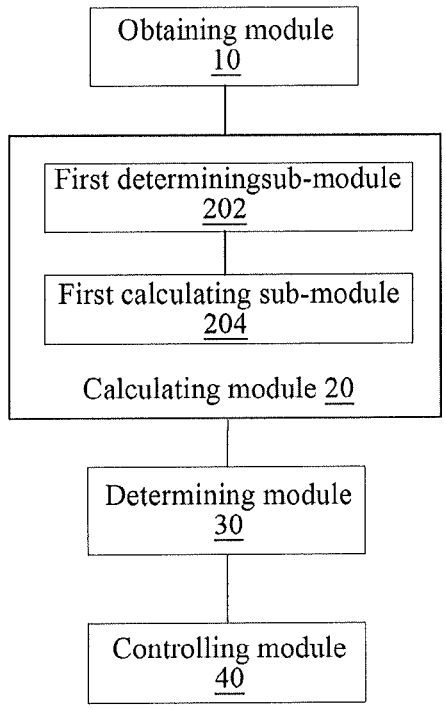
FIG. 3 is a schematic diagram of a control apparatus of a television set according to a second embodiment of the invention.

FIG. 3 is a schematic diagram of a control apparatus of a television set according to a second embodiment of the invention. As illustrated in FIG. 3, the control apparatus of the television set according to this embodiment includes the respective modules in the control apparatus of the television set in the foregoing embodiment, where the calculating module 20 includes:

A first determining sub-module 202 configured, when the motion curve is a closed curve, to determine positional information of the motion locus points on the closed curve; and A first calculating sub-module 204 configured to calculate polar angle information corresponding to the motion locus points from the positional information of the motion focus points.

Furthermore the determining module 30 is further configured to determine whether a polar angle corresponding to the polar angle information is above a preset polar angle.

The control module 40 is further configured to generate the control instruction when the polar angle corresponding to the polar angle information is above the preset polar angle.

In this embodiment, a user is required to make a circular gesture to control the television set with the gesture, and only in the case that the motion curve of the moving object is circular, the positional information of the motion locus points on the motion curve with a circular circumference is determined and the polar angle information corresponding to the motion locus points is calculated from the positional information, and finally a control instruction is generated when the polar angle is above the preset polar angle. A polar angle is adopted directly in this mode of generating a control instruction to determine a command simply and directly. A circular gesture differs from a normal action gesture, so it is unlikely for the control apparatus of the television set according to the embodiment of the invention to recognize any normal action gesture of the user as a control gesture while obtaining the locus points of the moving object, thus making it unlikely to perform any incorrect operation.

Fourth Embodiment

Figure 4:
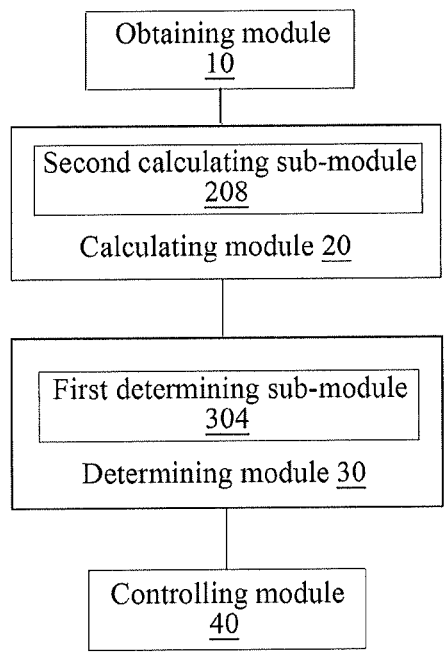
FIG. 4 is a schematic diagram of a control apparatus of a television set according to a third embodiment of the invention.

FIG. 4 is a schematic diagram of a control apparatus of a television set according to a third embodiment of the invention. As illustrated in FIG. 4, the control apparatus of the television set according to this embodiment includes the respective modules in the control apparatus of the television set in the foregoing second or third embodiment, where:

The calculating module 20 includes:

A second calculating sub-module 208 configured to calculate a product of the first sine and cosine and a product of second sine and cosine, where the product of the first sine and cosine is the product of the sine and the cosine of the angle information corresponding to the first locus point, and the product of the second sine and cosine is the product of the sine and the cosine of the angle information corresponding to the second locus point.

Furthermore the determining module 30 includes:

A first determining sub-module configured to determine whether the product of the first sine and cosine has the same sign as the product of the second sine and cosine.

The control module 40 is further configured to generate the control instruction to control the television set to act when the product of the first sine and cosine has a different sign from the product of the second sine and cosine.

In this embodiment, under the mathematic principle that the product of the sine and the cosine of any angle has a sign varying across adjacent quadrants, the product of the sine and the cosine of a polar angle is calculated through the second calculating sub-module, and taking a change in sign of the product of the sine and the cosine of the polar angle as a criterion, the control instruction to control the television set to act is generated when the first determining sub-module determines a change in sign of the product of the sine and the cosine of the polar angle of an adjacent locus point. A change in sign of the product of the sine and the cosine of the polar angle of an adjacent locus point is taken as a criterion to generate a command so that the precision of control can be high and the operation can be more accurate when the user controls the television set by a gesture.

Preferably the second calculating sub-module 208 is configured to perform calculation in the formula of:

$$N=[\sin(Q*\theta)]*[\cos(Q*\theta)],$$

Where $\theta$ represents a polar angle, N represents the product of the sine and the cosine of the polar angle, and Q represents any real number.

Figure 8A:
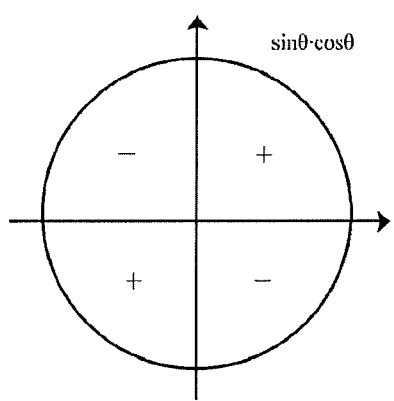
FIG. 8a and FIG. 8b are schematic diagrams in a quadrant distribution of a plane of a gesture for controlling a television set according to an embodiment of the invention.
Figure 8B:
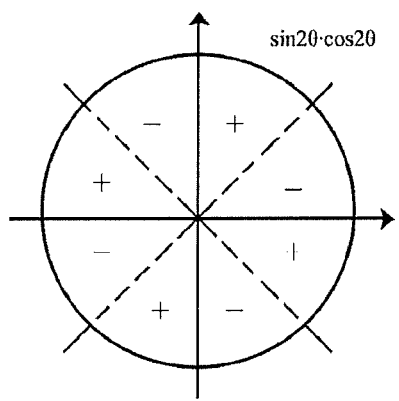

In this embodiment, the multiplier Q of a polar angle corresponds to the number of times that a command is transmitted, and a plane where the polar angle is located is divided into quadrants varying with different Q. FIG. 8a and FIG. 8b are schematic diagrams in a quadrant distribution of a plane of gestures according to an embodiment of the invention. As illustrated in FIG. 8a, the planar rectangular coordinate system is divided into 4 quadrants when Q is 1, that is, the product of the sine and the cosine of a polar angle varies 4 times in sign during motion of a hand around a circle, thus transmitting 4 commands per circle. As illustrated in FIG. 8b, the planar rectangular coordinate system is divided into 8 quadrants when Q is 2, that is, the product of the sine and the cosine of a polar angle varies 8 times in sign during motion of a hand around a circle, thus transmitting 8 commands per circle (e.g., 8 commands to boost volume).

Preferably the value of Q is 2.

If 4 commands are transmitted per circle, then numerous circles have to be drawn to transmit a large number of commands; and if 16 commands are transmitted per circle, a small change in polar angle may result in generation of a command when a few commands are to be transmitted, and at this time the precision of an operation has to be high. Summarily transmission of 8 commands per circle can bring the most comfort operation experience to a user in view of a motion characteristic of a human body itself.

Preferably the calculating module is configured to perform calculation in the formulas of:

$$\theta=\mathrm{mod}(\pm X.XXX,1.0)*2\pi,$$

Where $\theta$ represents a polar angle, $\pm X.XXX$ represents positional information of the motion locus points, "+" represents the motion direction of the moving object being the clockwise direction, "−" represents the motion direction of the moving object being the anticlockwise direction, an integer part preceding "." represents the number of circles that the moving object has completed on the motion curve, and a fraction part following "." represents the position of the moving object on the motion curve.

In this embodiment, firstly the positional information of the motion locus points is represented in the data format of $\pm X.XXX$ to thereby represent the direction information, the historical motion locus and the current positional information of the moving object conveniently and clearly. Different motion directions correspond to different commands to control the television set, and for typical control commands of the television set, they correspond respectively to adjusting upward and downward volume and to switching forward or backward a channel. FIG. 7a to FIG. 7p are schematic diagrams of a gesture for controlling a television set according to an embodiment of the invention. As illustrated in FIG. 7a, a hand rests at a starting location and then moves clockwise from FIG. 7a to FIG. 7d, where FIG. 7b illustrates the hand moving to a one-fourth circumference, FIG. 7c illustrates the hand moving to a one-second circumference, and FIG. 7d illustrates the hand moving to a three-fourth circumference, and if the hand continues to move clockwise, then it completes motion of a circle when it moves from the location illustrated in FIG. 7d to the location illustrated in FIG. 7a; and FIG. 7e to FIG. 7l represent polar angle information during clockwise motion, where FIG. 7e illustrates 0.000 indicating that the hand is located at the starting location, FIG. 7f illustrates +0.250 indicating ongoing one-fourth circling clockwise, FIG. 7k illustrates +1.500 indicating completion of the circle clockwise and proceeding to the one-second of a second circle clockwise. FIG. 7m to FIG. 7q illustrate anticlockwise motion, where FIG. 7o illustrates −0.875 indicating ongoing seven-eighth circling anticlockwise.

Secondly the position of a current locus point on the circumference is obtained by way of a remainder and then multiplied by $2\pi$ to thereby obtain the magnitude of the polar angle of the locus point. For example, A polar angle corresponding to +0.125 is:

$$\theta=\mathrm{mod}(+0.125,1.0)*2\pi=0.125*2\pi=\pi/4=45°.$$

A polar angle corresponding to +0.375 is:

$$\theta=\mathrm{mod}(+0.375,1.0)*2\pi=0.375*2\pi=3\pi/4=135°.$$

Preferably the moving object is a hand of the user.

In this embodiment, the purpose of controlling the television set by the action of drawing a circle is achieved. When the moving object is a hand, the action can be more flexible and direct, and the action of drawing a circle is simple but distinguished from a normal actions. The control parameter depending upon a change in product of the sine and the cosine of an angle is simple, convenient to calculate but stable and not influenced by a personal difference, e.g., the size of a drawn circle, the speed at which a circle is drawn and other factors, so an operation of the user can be facilitated and the precision of control can be high when the television set is controlled by the control apparatus of the television set according to the invention.

Fifth Embodiment

Figure 5:
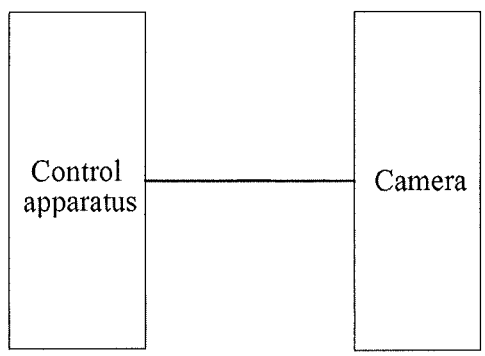
FIG. 5 is a block diagram of a television set according to an embodiment of the invention.

FIG. 5 is a block diagram of a television set according to an embodiment of the invention, and as illustrated in FIG. 5, the television set includes: a camera configured to capture images; and a control apparatus of the television set configured to fit motion locus points of a moving object in the images to a motion curve; to calculate angular information corresponding to the motion locus points on the motion curve; to determine whether the angular information corresponding to a first locus point among the motion locus points is in the same preset range as the angular information corresponding to a second locus point among the motion locus points, where the first locus point is adjacent to the second locus point; and to generate a control instruction to control the television set to act when the angular information corresponding to the first locus point is not in the same preset range as the angular information corresponding to the second locus point, where the camera can be built into the television set or arranged as a peripheral device of the television set (i.e., Plug & Play).

Figure 6:
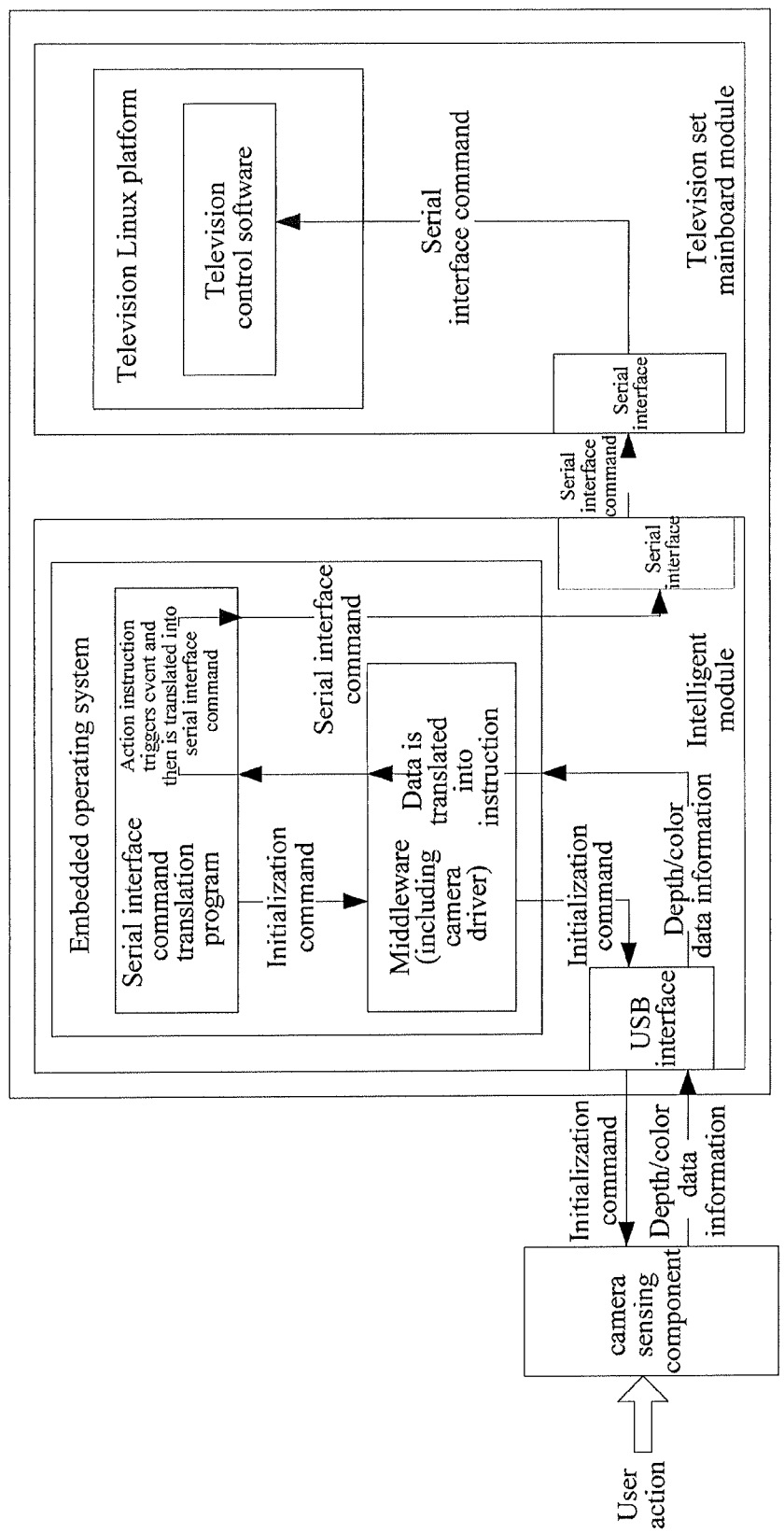
FIG. 6 is a schematic diagram of transmitting a control command of a television set according to an embodiment of the invention.

FIG. 6 is a schematic diagram of transmitting a control command of a television set according to an embodiment of the invention, and as illustrated in FIG. 6, firstly images of an action of a user are captured through a sensing component of a camera, and the depth, the color and other information of the images are transmitted into a television set system via a USB interface and subjected to a series of processes in an intelligent module of the television set, and a command is transmitted via a serial interface to television set control software arranged in an apparatus controlling the television set by a gesture to perform a process of controlling the television set by the action of the user.

For the camera as mentioned in the embodiments of the invention, a 2D webcam can be used, e.g., available camera from Logitech or other brands, and the foregoing camera captures planar images which can be translated into X and Y coordinates in a planar coordinate system at a number of frames per second ranging from 15 to 30 frames.

Preferably the camera used in the embodiments of the invention can be a 3D camera available from PrimeSense Corp., Israel, which is characterized by its capability to sense depth information through near infrared laser in addition to normal images in color, that is, the images can be translated into X, Y and Z coordinates in a three-dimension coordinate system, where Z represents the distance of a moving object from the camera, and the images with the depth information are captured at 30 frames per second (and possibly higher subsequently).

It shall be noted that the solution in the embodiments of the invention will not be restricted in terms of whether the camera is a 2D or 3D camera and of the number of frames per second as long as there are a sufficient number of elements for an analysis to locate a moving object and a locus for achieving the purpose of control.

In the embodiments, a control apparatus of a television set is arranged to facilitate control of the television set by a user using a gesture, and the control apparatus firstly fits motion locus points of a moving object to a motion curve and then calculates angular information corresponding to the motion locus points on the motion curve and further generates a control command to control the television set to act in response to a change in angular information of an adjacent motion locus point. For the television set with such a control apparatus, it is not necessary for the operating user to take numerous actions, and the radius of motion and the speed of motion will not be limiting in any way, so that the user operating the television set by a gesture can enjoy a better experience and more convenience.

As can be apparent from the foregoing description, the invention can achieve the technical effect of facilitating control of a television set by a user using a gesture.

As shall be apparent to those skilled in the art, the respective modules or the respective steps of the invention can be embodied in a general-purpose computing device, and they can be centralized on a single computing device or distributed across a network composed of a plurality of computing devices, and optionally they can be embodied in program codes executable by the computing device(s) so that they can be stored in a storage device for execution by the computing device(s) or they can be fabricated respectively as respective integrated circuit modules or a plurality of modules or steps among them can be fabricated as a single integrated circuit module. Accordingly the invention will not be limited to any specific combination of hardware and software.

The foregoing description is merely illustrative of the preferred embodiments of the invention but not intended to limit the invention, and various possible modifications and variations to the invention will be apparent to those skilled in the art. Any modifications, equivalent substitutions, adaptations, etc., made without departing from the spirit and principle of the invention shall be compassed in the claimed scope of the invention.

The invention claimed is:

1. A control method of a television set, comprising:
obtaining motion locus points of a moving object and fitting the motion locus points to a motion curve;
calculating angular information corresponding to the motion locus points on the motion curve;
determining whether the angular information corresponding to a first locus point among the motion locus points is in the same preset range as the angular information corresponding to a second locus point among the motion locus points, wherein the first locus point is adjacent to the second locus point; and
generating a control instruction to control the television set to act when the angular information corresponding to the first locus point is not in the same preset range as the angular information corresponding to the second locus point,
wherein calculating the angular information corresponding to the motion locus points on the motion curve comprises:
calculating a product of first sine and cosine and a product of second sine and cosine product, wherein the product of the first sine and cosine is the product of the sine and the cosine of the angle information corresponding to the first locus point, and the product of the second sine and cosine is the product of the sine and the cosine of the angle information corresponding to the second locus point, and wherein both the product of the first sine and cosine and the product of the second sine and cosine are calculated in the formula of:

$$N=[\sin(Q*\theta)]*[\cos(Q*\theta)].$$

wherein θ represents a polar angle, N represents the product of the sine and the cosine of the polar angle, and Q corresponds to the number of times that a command is transmitted, and a plane where the polar angle is located is divided into quadrants varying with different Q.

2. The method according to claim 1, wherein:
determining whether the angular information corresponding to the first locus point is in the same preset range as the angular information corresponding to the second locus point comprises:
determining whether the product of first sine and cosine has the same sign as the product of second sine and cosine; and
generating the control instruction to control the television set to act when the angular information corresponding to the first locus point is not in the same preset range as the angular information corresponding to the second locus point comprises:
generating the control instruction to control the television set to act when the product of the first sine and cosine has a different sign from the product of the second sine and cosine.

3. The method according to claim 1, wherein the value of Q is 2.

4. A control apparatus of a television set, comprising:
an obtaining module configured to obtain motion locus points of a moving object and to fit the motion locus points to a motion curve;
a calculating module configured to calculate angular information corresponding to the motion locus points on the motion curve;
a determining module configured to;
determine whether the angular information corresponding to a first locus point among the motion locus points is in the same preset range as the angular information corresponding to a second locus point among the motion locus points, wherein the first locus point is adjacent to the second locus point; and
a controlling module configured to generate a control instruction to control the television set to act when the angular information corresponding to the first locus point is not in the same preset range as the angular information corresponding to the second locus point,
wherein the calculating module comprises:
a second calculating sub-module configured to calculate a product of first sine and cosine and a product of second sine and cosine, wherein the product of the first sine and cosine is the product of the sine and the cosine of the angle information corresponding to the first locus point, and the product of the second sine and cosine is the product of the sine and the cosine of the angle information corresponding to the second locus point, and wherein the second calculating sub-module is configured to perform calculation in the formula of:

$$N=[\sin(Q*\theta)]*[\cos(Q*\theta)].$$

wherein θ represents a polar angle, N represents the product of the sine and the cosine of the polar angle, and Q corresponds to the number of times that a command is transmitted, and a plane where the polar angle is located is divided into quadrants varying with different Q.

5. The apparatus according to claim 4, wherein:
the determining module comprises:
a first determining sub-module configured to determine whether the product of the first sine and cosine has the same sign as the product of the second sine and cosine; and
the control module is further configured to generate the control instruction to control the television set to act when the product of the first sine and cosine has a different sign from the product of the second sine and cosine.

6. The apparatus according to claim 4, wherein the value of Q is 2.

7. A television set, comprising:
a camera configured to capture images; and
a control apparatus of the television set configured to fit motion locus points of a moving object in the images to a motion curve; to calculate angular information corresponding to the motion locus points on the motion curve; to determine whether the angular information corresponding to a first locus point among the motion locus points is in the same preset range as the angular information corresponding to a second locus point among the motion locus points, wherein the first locus point is adjacent to the second locus point; and to generate a control instruction to control the television set to act when the angular information corresponding to the first locus point is not in the same preset range as the angular information corresponding to the second locus point,
wherein the control apparatus of the television set is configured to calculate angular information corresponding to the motion locus points on the motion curve by:
calculating a product of first sine and cosine and a product of second sine and cosine product, wherein the product of the first sine and cosine is the product of the sine and the cosine of the angle information corresponding to the first locus point, and the product of the second sine and cosine is the product of the sine and the cosine of the angle information corresponding to the second locus point,
and wherein both the product of the first sine and cosine and the product of the second sine and cosine are calculated in the formula of:

$$N=[\sin(Q*\theta)]*[\cos(Q*\theta)],$$

wherein θ represents a polar angle, N represents the product of the sine and the cosine of the polar angle, and Q corresponds to the number of times that a command is transmitted, and a plane where the polar angle is located is divided into quadrants varying with different Q.

* * * * *